March 21, 1967  R. KREMP ET AL  3,309,975
STRUCTURE FOR ADJUSTING A CAMERA ACCORDING TO
CHARACTERISTICS OF FILM EXPOSED THEREIN
Filed June 30, 1964  2 Sheets-Sheet 1
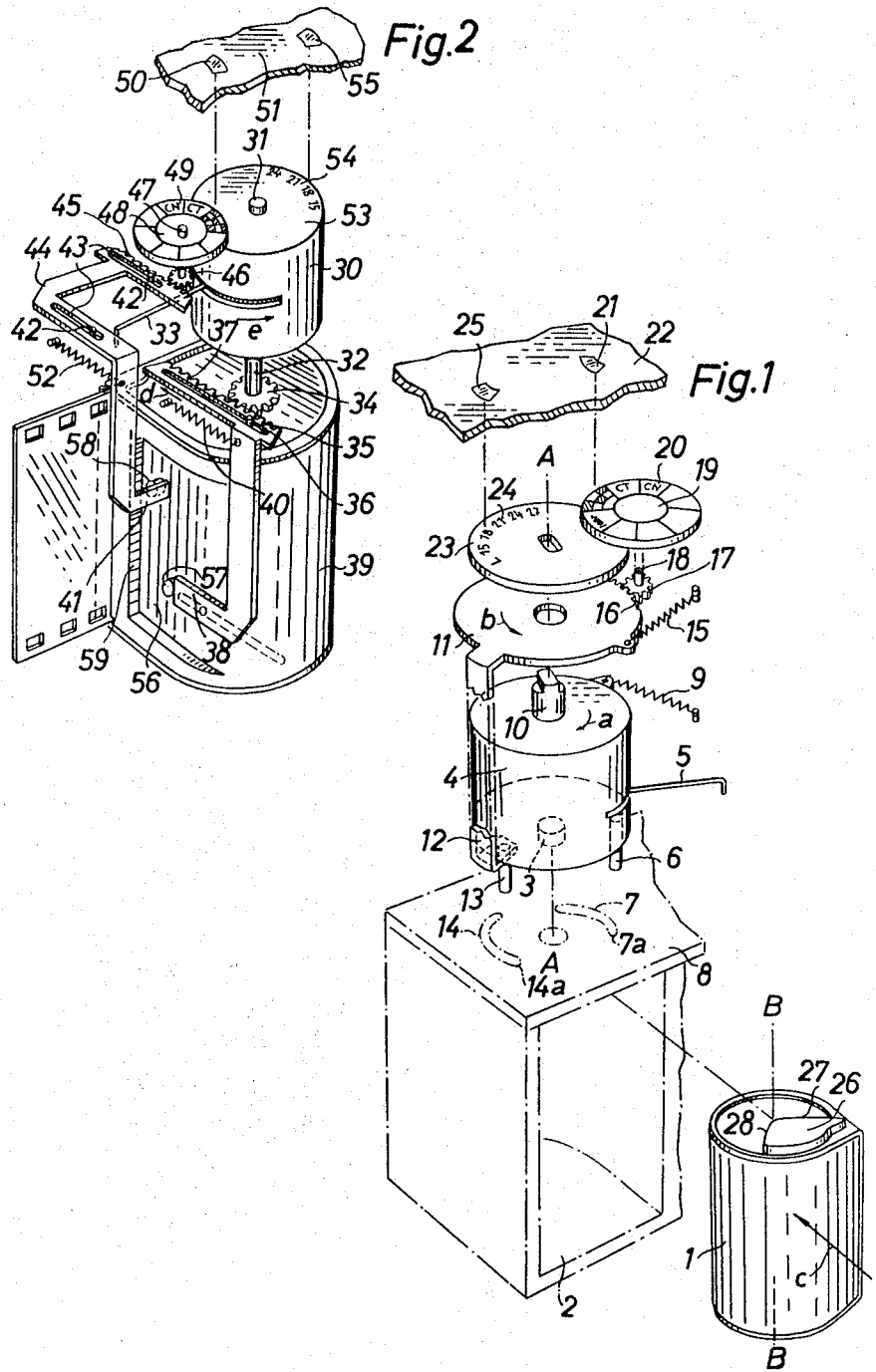
INVENTORS
RUDOLF KREMP
PAUL FROST
FRIDOLIN HENNIG
BY

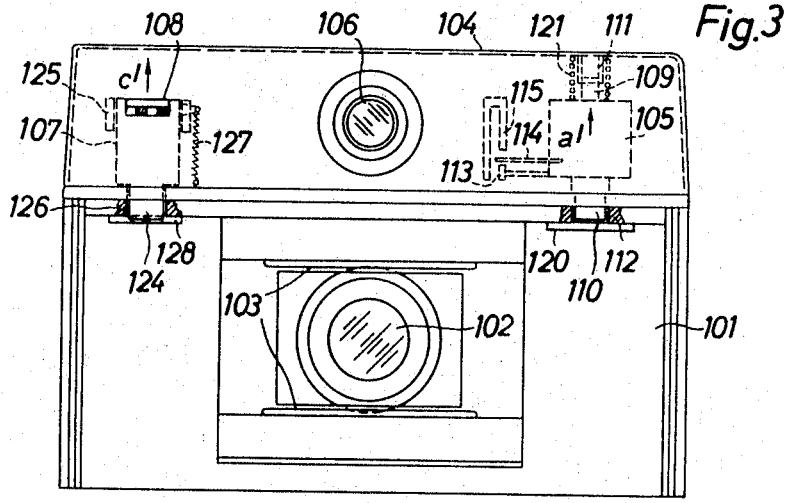
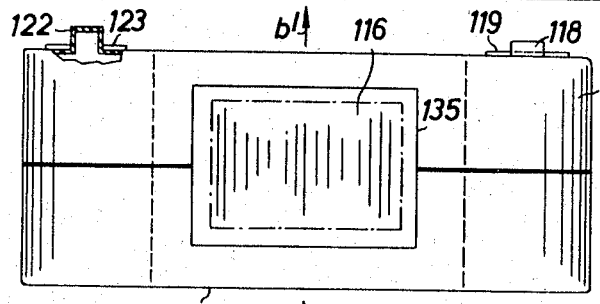
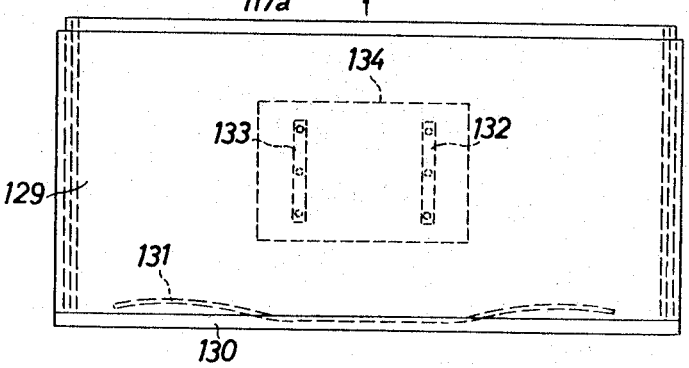

United States Patent Office 3,309,975
Patented Mar. 21, 1967

3,309,975
STRUCTURE FOR ADJUSTING A CAMERA ACCORDING TO CHARACTERISTICS OF FILM EXPOSED THEREIN
Rudolf Kremp, Grunwald, Munich, and Paul Frost and Fridolin Hennig, Munich, Germany, assignors to AGFA Aktiengesellschaft, Leverkusen, Germany
Filed June 30, 1964, Ser. No. 379,134
Claims priority, application Germany, July 4, 1963, A 43,495; Oct. 25, 1963, A 44,393
5 Claims. (Cl. 95—10)

The present invention relates to cameras.

More particularly, the present invention relates to devices for taking into consideration the type of film which is placed into a camera as well as the speed thereof.

Ordinarily film which is to be exposed in a camera is itself located in a suitable container and it is the container itself which becomes situated in the camera. The container for the film may be in the form of a suitable cartridge in which, for example, a single coil of film is situated, or the film may be contained in a magazine which forms the container which is introduced into the camera housing. In either case the film container conventionally sits loosely within the housing and has a fairly substantial play therein so that it is a very difficult matter to precisely adjust the camera in accordance with the speed of the film therein and to indicate to the operator the type of film which is in the film container. Of course, when a container of film is introduced into a camera the operator should make certain that the camera is properly adjusted to take into consideration the speed of the film, and this is particularly true in the case of cameras which are at least partly set automatically according to the lighting conditions. With cameras which have devices which respond automatically to the light so as to automatically set structures such as the aperture, exposure time, and the like of the camera, it is particularly important that the operator initially adjust the camera for the purpose of taking into consideration the speed of the film so that the automatic adjustments will be properly carried out. However, the operator, particularly if he is an amateur, may forget to introduce the factor of the speed of the film into the camera, so that improper exposures will be made, and even if a structure is provided for somehow automatically introducing this factor the fact that the film container is not precisely situated in the container makes it next to impossible to precisely adjust the camera, particularly if there are a relatively large number of film speed adjustments.

A further difficulty encountered is with respect to the particular type of film which is in the camera. Thus, even if the camera is provided with a means for indicating to the operator the speed of the film which is in the camera, it is quite possible that two or more types of film will have the same film speed, and the operator may forget whether the film in the camera is for example a color film or a black and white film, since the film speed alone does not necessarily indicate the type of film and it is possible for color film on the one hand and black and white film on the other hand to have the same film speed.

It is accordingly a primary object of the present invention to provide a structure which will make it possible for the operator to completely forget about any manual operations in connection with the type of film which is introduced into the camera or the speed of the film.

Thus, one of the objects of the present invention is to provide a structure which is capable of automatically setting the camera according to the speed of the film which is introduced therein.

Another object of the present invention is to provide a camera which is capable not only of automatically setting the camera according to the film speed but which is also capable of indicating the film speed to the operator.

Still another object of the present invention is to provide a camera which will indicate the type of film which has been placed in the camera in a fully automatic manner requiring no manipulations on the part of the operator.

Furthermore, it is an object of the present invention to provide a camera which will indicate not only the type of film but also the film speed.

Also, it is an object of the present invention to provide a camera which will on the one hand automatically indicate the type of film which has been introduced into the camera and which will on the other hand automatically make an adjustment according to the speed of the film which has been introduced into the camera.

Yet another object of the present invention is to provide a structure which is capable of very precisely positioning a film container in the interior of the camera so that the automatic indications or adjustments can be very precisely carried out.

Yet another object of the present invention is to provide a structure of the above type which is exceedingly simple and inexpensive even though the container is very precisely located within the camera and even though a relatively large number of adjustments and indications are made in an extremely accurate manner.

Also, it is an object of the present invention to provide a structure of the above type which is very compact so that it occupies only a small amount of space and which at the same time is relatively inexpensive and completely reliable in operation.

Yet another object of the present invention is to provide a film container structure which is adapted for use in a camera of the above type.

With the above objects in view the invention includes, in a camera which is adapted to accommodate a container which contains film to be exposed in the camera, a support means which forms part of the camera and which has a compartment which is adapted to receive a film container. A film container is adapted to be placed in the compartment of the support means and this film container carries at is exterior a pair of surface portions which have on the film container positions which are respectively indicative of the speed of the film which is in the container and the type of the film which is in the container. A pair of moving means are movably carried by the support means and extend into the compartment to be engaged by the surface portions of the container during introduction of the latter in the compartment so as to move the pair of moving means with respective to the support means to positions where the pair of moving means will respectively take locations indicative of the speed of the film and the type of the film when a container is situated in the compartment of the support means of the camera. A pair of moved means are operatively connected to the pair of moving means to be moved thereby, and one of these moved means is an indicating means capable of indicating to the operator the type of film which is in the camera while the other of the moved means is a means for automatically adjusting the camera according to the speed of the film which is in the container, and this latter means also indicates to the operator the speed of the film. In accordance with a further features of the invention the film container carries a pair of locating surfaces which are adjacent the surface portions thereof which respectively are indicative of the type of film and the speed of the film which is in the container, and the support means itself carries a pair of locating surfaces which are respectively engaged by the pair of locating surfaces of the container when the latter is in the compartment, so that by reason of this engagement between these pairs of locating surfaces the film container can be very precisely located in the compartment and thus very accurate indications of the type of film as well as the speed thereof and a very accurate adjustment for film speed can be made. The support means carries a spring means which acts on the container when the latter is in the compartment to urge the locating surfaces of the container against the locating surfaces of the support means, respectively, so that in this way all play is eliminated between the container and the support means and thus the cooperating pairs of locating surfaces can very precisely determine the position of the container in the camera.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is an exploded perspective illustration of one possible embodiment of a structure according to the present invention;

FIG. 2 is a partly exploded perspective illustration of another possible embodiment of a structure according to the present invention;

FIG. 3 is a rear view of a camera according to the invention which has its rear and bottom walls removed;

FIG. 4 is a rear elevational view of a magazine adapted to be placed within the camera of FIG. 3; and FIG. 5 is a rear elevation of the combined rear and bottom walls of the camera of FIG. 3 to be joined to the latter for forming therewith the compartment which receives the magazine of FIG. 4.

Referring to FIG. 1, there is illustrated therein a film container 1 in the form of a cartridge which in the illustrated example contains a coil of film which is not supported on any rotary spool so that the film is simply withdrawn from the cartridge in order to be exposed, and the film will be reintroduced in another cartridge to be automatically coiled therein after the film is exposed. There is also shown in dot-dash lines in FIG. 1 a part of a camera which includes the support means 2 which forms part of the camera housing and which has a compartment illustrated in FIG. 1 for receiving the container 1. Situated above the compartment of the support means of the camera is a moving coil type of electrical instrument such as a galvanometer 4, and the housing of the galvanometer carries at its bottom wall a pivot pin 3 coaxial with the galvanometer and extending into an opening of a wall 8 of the support means so that the instrument 4 is supported for rotary movement about its axis A—A. When the cartridge 1 is in the compartment of the support means 2 the axis A—A of the galvanometer coincides with the axis B—B of the cartridge about which the film therein is coiled. The instrument 4 has a pointer 5 connected to its moving coil, and the instrument is electrically connected in a well know manner with a photosensitive device so that the pointer 5 together with the moving coil will assume angular positions according to the light intensity. The angular position of the pointer 5 can be sensed in a well known manner by a suitable scanning means which by engaging the pointer 5 will assume a position determined by the lighting conditions, and this scanning means can in a known manner be connected to structure for automatically setting the camera at least in part for making proper exposures according to the lighting conditions. The particular manner in which the instrument 4 is used forms no part of the present invention, and it can, for example, be used with semi-automatic cameras according to which the operator will manually adjust the camera until the pointer 5 is brought into aligment with a stationary index, or a movable index can be manually brought into aligment with the pointer 5 for the purpose of manually adjusting the camera according to the position of the pointer 5. Also, the moving coil can be connected either directly or through a suitable transmission with a structure such as the diaphragm of the camera for directly adjusting the latter as is conventional in motion picture cameras, for example.

The instrument 4 forms a moved means which is operatively connected to a moving means to be moved by the latter for the purpose of adjusting the camera according to the film speed, and in the illustrated example the moving means which is operatively connected to the instrument 4 takes the form of a pin 6 which is fixed to and extends downwardly from the lower wall of the housing of the instrument, this pin 6 extending through an arcuate slot 7 which is formed in the stationary wall 8 of the support means. This pin 6 will extend in this way through the slot 7 into the interior of the compartment which receives the cartridge 1, and since the slot 7 is curved along an arc of a circle whose center is in the axis A—A, the pin 6 is free to move along the slot 7 during turning of the intsrument 4 about the axis A—A. If desired the pin 6 can instead be carried by a suitable carrier element which is arranged in the compartment which receives the cartridge 1 and which is fixed to the pin 3 which participates in the rotary movement of the instrument 4. The location of the instrument 4 directly over the slot 7 prevents light from entering through the slot 7 into the compartment which receives the cartridge 1. A spring 9 is connected to the instrument 4 and urges the latter in the direction of the arrow $a$ until the pin 6 engages the end 7$a$ of the slot 7.

The upper wall of the housing of the instrument 4 fixedly carries a shaft 10 which is coaxial with the instrument, and a disc 11 is freely turnable about the shaft 10, the latter extending with a sliding fit through a central opening of the disc 11. This disc 11 forms part of an indicating means for indicating to the operator the type of film which is in the cartridge 1, and the indicating means for indicating the type of film forms a moved means which is operatively connected to a second moving means to be moved thereby in response to introduction of the cartridge 1 into the compartment of the support means of the camera. This second moving means includes the elongated arm 12 which extends around the instrument 4, which is fixed at its top end to the disc 11, and which carries at its bottom free end a second pin 13 which extends through an arcuate slot 14 formed in the wall 8 into the interior of the compartment of the support means 2 which receives the cartridge 1. This slot 14 also extends along a circle whose center is in the turning axis A—A of the instrument 4, so that the pin 13 can move freely along the entire length of the slot 14. This pin 13 can also be mounted on a suitable carrier in the comaprtment which receives the cartridge 1, and in this case such a carrier can, for example, be connected to the arm 12 through a hollow shaft which surrounds the pin 3.

A spring 15 is operatively connected to the disc 11 for urging the latter in the direction of the arrow $b$ until the pin 13 engages the end 14$a$ of the slot 14. A portion of the peripheral edge of the disc 11 is provided with teeth 16 which mesh with a pinion 17 which is fixed to the bottom end of a shaft 18 which is supported for rotary movement by any unillustrated bearings and which fixedly carries at its top end an indicating disc 19. The upper surface of the indicating disc 19 is visible to the operator and is provided with a scale 20 of indications or symbols corresponding to the type of film which is in the cartridge 1. Thus, the indicia which form the scale 20 can indicate whether the film is, for example, a color negative film, a color reversal film, or a black-and-white film. For the purpose of rendering the upper surface of the disc 19 visible there is provided a window 21 formed in and carried by an exterior camera wall 22, and the size of the window 21 is such that only one symbol or sign of the scale 20 is visible at any one time through the window 21.

In order to be able to indicate to the operator the speed of the film which is in the cartridge, a second indicating disc 23 is mounted directly on the shaft 10 but cannot turn relative thereto. Thus, as is apparent from FIG. 1, the upper end of the shaft 10 is of a reduced substantially rectangular cross section and is received in a central opening of the disc 23 which is of a mating configuration so that there can be no relative turning between the indicating disc 23 and the shaft 10 which of course is compelled to turn with the instrument 4. The indicating disc 23 carries a scale 24 of film speeds, and in a manner similar to the scale 20 the scale 24 is situated beneath a window 25 carried by the exterior wall 22 so that the scale 23 is visible through the window 25, and the size of the window 25 is such that at any one time only one graduation of the scale 24 is visible through the window 25.

In the embodiment of the invention which is illustrated in FIG. 1, the container 1 carries at its top end wall a pair of exterior surface portions 27 and 28 which have with respect to the container 1 positions which are respectively indicative of the film speed and the type of film which is in the container 1. These surface portions 27 and 28 form part of a member 26 which is fixedly carried by the top wall of the cartridge. It is to be noted that in the illustrated example the pair of surface portions 27 and 28 are inclined oppositely with respect to each other.

The cartridge 1 is moved in the direction of the arrow $c$ into the compartment of the support means of the camera which is adapted to receive the film container, and during movement in the direction of the arrow $c$ the surfaces 27 and 28 will respectively engage the pins 6 and 13 and will displace them respectively along the slots 7 and 14 thus simultaneously turning the innstrument 4 in a direction opposite to that indicated by the arrow $a$ and the disc 11 in a direction opposite to that indicated by the arrow $b$, and inasmuch as the locations of the surfaces 27 and 28 on the cartridge 1 are indicative of the speed and type of film therein the pins 6 and 13 will be moved through angular distances which are also indicative of the speed and type of film in the cartridge 1, so that the extent of movement of the instrument 4 and the disc 11 will be in accordance with the speed and type of film in the cartridge 1, respectively. This movement of the instrument 4 will in a known manner automatically adjust the camera according to the speed of the film in the cartridge 1, and it will be noted that the disc 23 turns with the instrument 4 so that the operator can see through the window 25 that graduation of the scale 24 which indicates the speed of the film which is in the cartridge 1, the surface 27 of course being positioned at a location which is determined by the speed of the film which has been placed in the cartridge 1. The turning of the disc 11 through the transmission 16–18 turns the disc 19 through an angular position which is indicative of the type of film which is in the cartridge, and the operator can see the type of film through the window 21, the position of the surface 28 on the cartridge also being determined by the type of film therein.

Thus, with the above-described structure of the invention it is possible to indicate to the operator the type of film independently of the film speed. This arrangement enables the operator to accurately determine whether, for example, a black-and-white film or a color negative film is in the camera, even if it should happen that both of these films have precisely the same film speed.

The embodiment of the invention which is illustrated in FIG. 2 also includes a moving coil instrument 30 which by means of a pin 31 and a shaft 32, both of which are coaxial with the axis of the instrument 30, can be supported in unillustrated stationary bearings so as to be turnable in its entirely about its axis. With this embodiment also the moving coil instrument forms part of a well known and unillustrated exposure controlling structure.

The shaft 32 connects the instrument 30 to a pinion 34 which meshes with a rack 37 which is guided for linear movement by the cooperation between a pair of stationary pins 35, only one of which is shown in the drawing, and an elongated slot 36 which is formed in and extends longitudinally of the rack 37 and which receives the stationary pins 35, so that in this way a pin-and-slot straight-line guide is provided for the rack 37. This rack 37, which thus meshes with the pinion 34, fixedly carries an arm 38 of angular configuration and forms with the arm 38 a moving means extending into the compartment for receiving the film container and operatively connected through the transmission 37, 34, 32 to the moved means which in this case is formed by the instrument 30. In the example of FIG. 2 the film container 39 is in the form of a cartridge similar to the cartridge 1, and it is introduced into an unillustrated compartment of the support means of the camera. A spring 40 is operatively connected with the arm 38 for urging the latter and the rack 37 in direction of the arrow $d$.

A second moving means extends into the compartment which receives the film container 39, and this second moving means includes an arm 41 which is also of an angular configuration and which is guided for straight-line movement in the direction of the arrow $d$ by a pin-and-slot guiding structure 42, 43, so that the arm 41 is compelled to move in a direction parallel to the plane in which the arm 38 moves. The arm 41 is fixed through a portion 44 thereof with a second rack 45 which extends parallel to the rack 37 and which meshes with a pinion 46 which is fixed to the bottom end of a shaft 47 supported for rotary movement by any suitable bearings and fixedly carrying an indicating disc 48 which carries signs or symbols 49 which also indicate the type of film which is in the cartridge 39. The indicia of the scale 49 is visible through a window 50 carried by an exterior wall 51 of the camera, and here again the size of the window 50 is such that only one sign or symbol of the scale 49 will be visible at one time. A spring 52 is connected to the arm 41 for urging the latter also in the direction of the arrow $d$.

In the example ilustrated in FIG. 2, for the sake of simplicity, the scale of film speeds is carried directly by the upper surface of the upper wall 53 of the housing of the instrument 30, so that an additional disc such as the disc 23 of FIG. 1 is unnecessary, and this scale 54 of film speeds is visible through a window 55 carried by the outer wall 51 of the camera. This window 55 is also only large enough so as to render only one graduation of the scale 54 visible at one time.

In the embodiment of FIG. 2 the film cartridge 39 has a flat exterior surface portion 56 which carries a pair of projections 57 and 58 located at predetermined distances from an elongated shoulder 59 which is adapted to engage a locating surface of the camera when the cartridge 39 is introduced into the film-receiving compartment thereof so as to precisely determine the position of the cartridge 39 in the camera, and the distances of the projections or pins 57 and 58 from the shoulder 59 are respectively indicative of the speed and type of film in the cartridge 39. The camera is constructed in such a way that when the container 39 is in the compartment of the support means of the camera a spring engages the cartridge 39 to hold the shoulder 59 thereof against the locating or stop surface which engages the shoulder 59 to determine the location of the cartridge 39 in a very precise manner.

When the cartridge 39 is introduced into the camera in a direction opposite to that indicated by the arrow $d$ the projections 57 and 58 respectively engage the arms 38 and 41 so as to actuate the pair of moving means which are formed by these arms, and thus the pair of moving means are simultaneously moved in a direction opposite to that indicated by the arrow $d$ in opposition to the springs 40 and 52, respectively. The racks 37 and 45 will of course also move at this time, and through the pinions 34 and 46, respectively, the pair of moved means formed by the instrument 30 and the indicating disc 49 will both be moved so as to automatically indicate the film speed and type of film, respectively, inasmuch as the extent to which the instrument 30 and disc 49 are turned will also be determined by the locations of the pins 57 and 58 relative to the shoulder 59. Of course, the turning of the instrument 30 will also automatically adjust the camera for the particular speed of the film which is in the cartridge 39. Thus, the camera will be automatically adjusted according to the film speed, simultaneously an indication of the film speed will be provided through the window 55, and in addition an indication of the type of film will be provided through the window 56, and all of these results will automatically follow from the introduction of the film container 39 into the compartment of the support means which forms part of the camera.

In both of the above-described embodiments the adjustment for film speed is brought about by changing the angular position of the galvanometer, but it is of course also possible to provide this adjustment in other ways. For example, it is possible to use the surface 27 or the pin 57 for the purpose of adjusting the extent to which a cover member covers a window through which light reaches the photosensitive element wihch is electrically connected with the galvanometer, or these control surfaces may also be used for actuating a structure which will adjust a variable resistor in the electrical circuit which includes the instrument 4 or 30, so that in these ways also it is possible to automatically adjust the camera according to the speed of the film which is in the container which is received by the camera.

In the embodiment of the invention which is illustrated in FIGS. 3–5, the camera housing 101 includes the support means which forms the compartment for receiving the film container, and the camera housing 101 is shown diagrammatically in FIG. 3 carrying the objective 102, the housing 101 also carrying an unillustrated shutter. At the rear end of the light shaft along which the light passes from the objective to the focal plane the camera housing 101 is provided with the guides 103 which engage the film in a well known manner to guide the film for movement through the focal plane so that in this way one frame after the other of the film can be exposed. The camera housing 101 carries a hollow cap 104 which defines with the top wall of the camera housing an upper compartment which accommodates the moving coil instrument 105 which in a well known and not further illustrated manner is electrically connected with a photosensitive element exposed to light at the front of the camera. The compartment 104 also carries a viewfinder 106 and a slidable indicator plate 107 part of which is visible through a window 108 carried by the rear wall of the cap 104. The indicator plate 107 carries the signs, symbols, or labels which indicate the various types of film, and for this purpose selected areas of the plate 107, at its rear face which is visible through the window 108, can be differently colored or may be provided with different patterns or different labels, so that in accordance with the particular area which can be seen through the window 108 there will be an indication to the operator of the type of film which is in the camera.

The moving coil instrument 105 carries, coaxial with its coil, a pair of projections 109 and 110 which are respectively fixed to and extend upwardly and downwardly from the instrument 105, and these projections are guided in suitable bearings 111 and 112 which are fixedly carried by the camera so that in this way the instrument 105 is guided for movement along its axis either in the direction of the arrow $a'$, or in the opposite direction, but it is to be noted that the instrument 105 shown in FIG. 3 is incapable of turning in its entirety. In other words a pin or key carried by the guide 112, for example, can be situated in a suitable elongated groove or keyway formed at the exterior of the pin 110 and extending parallel to the axis of the instrument so that while the instrument is free to move along its axis it cannot rotate. However, the moving coil within the interior of the instrument is of course free to rotate so as to assume angular positions determined by the lighting conditions. An anvil 113 is fixedly carried by the housing of the instrument 105 and is situated beneath and spaced closely to the pointer 114 which is fixed to the moving coil of the instrument for turning movement with the moving coil thereof, so that while the pointer 114 can move freely over the anvil 113 nevertheless the latter will limit the extent to which the pointer 114 can be downwardly deflected, so that in this way the instrument will be protected. A scanning means 115 is situated within the compartment 104 and when an exposure is to be made this scanning means 115 will in a known manner be released for downward movement into engagement with the pointer 114, and the bottom edge of the scanning means 115 is suitably stepped or inclined or curved, in a manner well known in the art, so that the extent to which the scanning means 115 moves downwardly is also determined by the lighting conditions, since the angular position of the pointer 114 will determine the extent to which the scanning means 115 can move downwardly, and thus this scanning means 115 can be used to automatically set the camera, at least in part, in accordance with the lighting conditions. Thus, the scanning means 115 can in a well known manner be connected with a structure for setting the exposure time and/or the diaphragm, and when the scanning means 115 is released it will move downwardly in a direction opposite to that indicated by the arrow $a'$. Thus, the extent to which the scanning member 115 can move downwardly from its rest position until it engages the pointer 114 and presses it against the anvil 113 is a measure of the light intensity, but should take into consideration the speed of the film so that a proper adjustment will be made.

In order to automatically take into consideration the speed of the film the cassette or magazine 117 shown in FIG. 4 is adapted to be received in the compartment of the camera and carries at its top wall a projection 118 the length of which is indicative of the speed of the film within the cassette 117. When the cassette 117 is in the camera the projection 118, which is coaxial with the coil of film at the right of the cassette, as viewed in FIG. 4, engages the lower projection or pin 110 so as to advance the instrument 105 upwardly in the direction of the arrow $a'$. The upper wall of cassette 117 carries a locating surface 119 formed, for example, by the upper surface of a ring which is fixedly mounted on the top wall of the cassette and which surrounds the projection 118, and this locating surface 119 is advanced upwardly with cassette 117 in the direction of the arrow $b'$ when the film container 117 is introduced into the interior compartment of the support means of the camera 101. The upper wall of the camera which is situated beneath the cap 104 and which carries the latter fixedly carries at its underside, which defines the top of the film container receiving compartment, a second locating surface 120 formed, for example, by the lower surface of an annular ring which is fixed in the interior of the camera and which forms an opening through which the pin 110 can pass as well as through which the projection 118 can pass, so that when the container 117 is introduced into the camera the pin 118 will pass upwardly through the ring which has the locating surface 120 enabling the locating surface 119 to engage the locating surface 120, so that in this way the engagement between these surfaces will very precisely determine the location of the magazine 117 in the interior of the camera.

Inasmuch as the height or length of the projection 118 corresponds to the speed of the film in the cassette 117, the extent to which it raises the instrument 105 when the locating surface 119 engages the locating surface 120 will also be indicative of the speed of the film, so that in this way the elevation of the instrument 105 is adjusted according to the film speed, and it will be noted that this adjustment locates the pointer 114 closer to the scanning member 115 so that in this way an adjustment is automatically made for the speed of the film which is in the cassette 117. A spring 121 surrounds the pin 109 and the bearing 111 and engages the instrument 105 at its top wall and the cap 104 at the underside of its top wall so as to urge the instrument 105 downwardly, and in this way the top surface of the projection 118 will reliably be maintained in engagement with the bottom surface of the pin 110, so that the elevation of the instrument 105 will be accurately adjusted and maintained adjusted according to the film speed. Of course, during upward introduction of the container 117 into the magazine compartment of the camera the pin 118 will engage the pin 110 and move the instrument 105 in the direction of the arrow $a'$ in opposition to the spring 121.

The cassette 117 carries an additional projection 122 which is coaxial with the coil of film located at the left end of the cassette 117, as viewed in FIG. 4, and, for example, the unexposed film may be located at the left end of the cassette while after exposure of the film it may be coiled up at the right end of the cassette, as viewed in FIG. 4. The upper wall of the cassette 117 carries a second locating surface 123 formed by the upper face of a ring which surrounds the projection 122 and which is fixed to the top surface of the cassette 117, and the length of the projection 122, which is to say the distance through which it extends upwardly from the top wall of the container 117, is indicative of the type of film which is located in the container 117.

The slide plate 107 fixedly carries at its bottom end an integral projection 124 which is coaxial with the projection 122 when the container 117 is in the camera, so that when the container 117 is introduced into the camera compartment the projection 122 will engage the projection 124 and advance the plate 107 upwardly in the direction of the arrow $c'$, so that in this way the elevation of the indicating plate 107 will be regulated in accordance with the type of the film which is in the cassette, and of course the type of the film will be indicated through the window 108 as described above. The inner surface of the rear wall of the cap 104 carries a pair of straight guides 125 which extend vertically and which are located at opposite sides of the plate 107 so as to guide the latter for straight-line movement up or down either in the direction of the arrow $c'$ or in opposite direction. A spring 127 is fixed to an element which projects from the plate 107 and to the top wall of the camera housing which carries the cap 104 so that in this way the spring 127 urges the indicating plate 107 downwardly in a direction opposite to that indicated by the arrow $c'$. In this way when there is no container of film in the camera the spring 127 will maintain the indicating plate 107 in a lower end position where a shoulder of the plate 107 engages the top wall of the camera, and the plate 107 is shown in this position in FIG. 3. The bottom end of the projection 124 of course communicates with the interior of the compartment which receives the film container 117, and it will be noted that the projection 124 extends through an opening 126 of the top wall of the camera, this opening serving to also guide the plate 107 for vertical straight line movement. It is to be noted that the top wall of the camera is also provided with an opening 112 which receives the pin 110 for guiding the latter, as pointed out above. The bottom end of the projection 124 is surrounded by a ring which is fixed to the underside of the top wall of the camera and which terimnates in a bottom locating surface 128 which is adapted to be engaged by the surface 123 of the cassette 117 in order to precisely determine the location of the latter at its left portion, as viewed in FIG. 4. Inasmuch as the height of the projection 122 is indicative of the type of film which is in the cassette, it is clear that when the locating surface 123 engages the locating surface 128 the pin 124 and of course the indicating plate 107 will be situated at a precisely determined elevation which of course will be indicative of the type of film which is in the container 117, and, as was mentioned above, this type of film will be indicated through the window 108.

Referring to FIG. 5, it will be seen that in the illustrated example the camera 101 has a removable rear wall 129 which is shown in FIG. 5, and this removable rear wall 129 is rigidly fixed with the bottom wall 130 of the camera, these walls 129 and 130 being integral with each other, for example. Thus, in order to have access to the compartment which receives the film container 117 the operator can remove the unit which is composed of the rear and bottom walls 129, 130, and of course in order to close the camera after a film container has been placed therein the operator will replace the unit composed of the rear wall 129 in the bottom wall 130, and this unit is held in its closing position in any suitable well known manner which does not form part of the present invention. In order to remove the unit 129, 130 it is moved downwardly, and when it is replaced it is of course moved upwardly.

A spring means is provided for urging the film container 117 in a direction which presses the surfaces 119 and 123, respectively against the surfaces 120 and 128, and in the illustrated example this spring means takes the form of a leaf spring 131 fixedly connected at its central portion to the upper surface of the bottom wall 130 and having a pair of free upwardly curved ends, as shown in FIG. 5, adapted to engage the bottom surface 117$a$ of the film container 117 for urging the latter in the direction of the arrow $b'$. Thus, this spring means 131 will guarantee that the container 117 will be mounted without any play in the interior of the camera and in addition it will guarantee that the locating surfaces 119 and 123 respectively press against the locating surfaces 120 and 128, so that the very precise determination of the elevation of the container 117 in the camera is guaranteed with the exceedingly simple structure, and since the adjustments of the elements 105 and 107 is determined by the elevation thereof, it will be seen that these adjustments will be very precisely carried out.

The inner surface of the rear wall 129 of the camera carries a pair of leaf springs 132 and 133 which in turn carry a pressure plate 134 which in a well known manner presses against the film so as to reliably hold the film in the focal plane. The outer dimensions of the pressure plate 134 are somewhat smaller than the size of the opening 135 at the rear wall of the cassette 117 and a further unillustrated opening in the front wall of the cassette, so that in this way the pressure plate 134 can reliably press the film 116 directly against the guides 103, so as to reliably position the film in the focal plane.

Of course, instead of providing a construction where the rear wall 129 of the camera is integral with the bottom wall and must move downwardly, it is possible to use with the invention the type of camera rear wall which is, for example, hingedly connected to the camera housing for swinging movement between closed and open positions. Furthermore, it is also possible to provide projections similar to the projections 118 and 122 but situated at the front of the cassette and projecting forwardly so that in this case the spring means 131 would be mounted on the rear wall of the camera. Moreover, the embodiment of FIGS. 3–5 can be adapted in order to indicate the speed of the film to the operator.

Thus, it will be seen that with the embodiment of FIGS. 3–5 while there is a complete elimination of any play of the film container 117 when it is in the camera, at the same time the cost of the manufacture is very low and in addition the precision of the adjustments is maintained very high.

It will be understood that each of the elements described above, or two or more together, may also find a useful application in other types of cameras differing from the types described above.

While the invention has been illustrated and described as embodied in cameras for indicating film characteristics, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera which is adapted to accommodate a container which contains film which is adapted to be exposed in the camera, in combination, support means forming part of the camera and having a compartment which is adapted to receive a film container; a film container adapted to be inserted into said compartment and having at its leading face as seen in the direction of insertion of said container into said compartment a pair of signal generating means respectively indicative of the speed and the type of the film which is in the container; a pair of sensing means movably carried by said support means and extending into that region of said compartment which is adjacent said leading face of said container, said pair of sensing means being respectively located in the paths along which said pair of signal generating means move during introduction of said container into said compartment to receive a signal generated by the respective signal generating means in response to insertion of said container in said compartment, so that when said container is in said compartment said pair of sensing means will be placed into conditions which are respectively indicative of the speed and type of film which is in said container; and a pair of signal transmitting means operatively connected to said pair of sensing means to transmit signals received thereby, one of said pair of signal transmitting means indicating the type of film which is in said container and the other of said pair of signal transmitting means automatically adjusting the camera according to the speed of the film which is in the container.

2. In a camera according to claim 1, further comprising spring means operatively connected to said pair of sensing means for urging the latter in directions respectively opposed to said direction along which said signal generating means move during introduction of a container into said compartment, said spring means holding said pair of sensing means at predetermined end positions along said paths when a container is out of said compartment.

3. In a camera adapted to receive a container which contains film which is to be exposed in the camera, in combination, support means forming part of the camera and having a compartment for receiving a film container; a film container adapted to be received in said support means and having a leading wall portion as seen in the direction of insertion of said container into said compartment, said leading wall being provided at the exterior of the container with a pair of signal generating means respectively indicative of the type and speed of the film in said container, said leading wall portion being provided in the region of said projections with a pair of locating surfaces; a second pair of locating surfaces carried by said support means for respectively engaging said locating surfaces of said container for precisely positioning the latter in said compartment; spring means carried by said support means and engaging said container for urging the latter in a direction which presses said pair of locating surfaces of said container against said pair of locating surfaces of said support means, respectively; and a pair of means carried by said support means and respectively located in the path of said signal generating means and placed thereby during introduction of said container into said compartment into condition respectively indicating the type of film which is in said container and adjusting the camera according to the speed of the film therein.

4. In a camera which is adapted to accommodate a container which contains film which is adapted to be exposed in the camera, in combination, support means forming part of the camera and having a compartment which is adapted to receive a film container; a film container adapted to be inserted into said compartment and having at its leading face as seen in the direction of insertion of said container into said compartment a pair of signal generating means respectively indicative of the speed and the type of the film which is in the container, and a locating means; a pair of sensing means movably carried by said support means and extending into the region adjacent said leading face of said container when the latter is in said compartment, said pair of sensing means being respectively located in the path along which said pair of signal generating means move during introduction of said container into said compartment in said direction to receive a signal generated by the respective signal generating means in response to insertion of said container in said compartment, so that when said container is in said compartment said pair of sensing means will be placed into conditions which are respectively indicative of the speed and type of film which is in said container; and second locating means provided on said support means in the region of said compartment which is adjacent said leading face of said container when the latter is in said compartment, said second locating means engaging said first mentioned locating means for accurately positioning said film container with respect to said support means.

5. In a camera according to claim 4, wherein said leading face of said film container includes a flat exterior surface facing in said direction of insertion of the container and said sensing means being movable in direction substantially normal to said flat exterior surface.

References Cited by the Examiner

UNITED STATES PATENTS 3,176,599  4/1965  Anwyl _____ 95—10
3,194,132  7/1965  Nerwin _____ 95—10

FOREIGN PATENTS 456,783  8/1944  Belgium.

JOHN M. HORAN, *Primary Examiner.*